United States Patent [19]

Seewi et al.

[11] Patent Number: 4,568,551

[45] Date of Patent: Feb. 4, 1986

[54] PROCESS FOR PRODUCING A BASE PRODUCT FOR THICKENED SAUCES AND SOUPS WHICH DISPERSES IN HOT WATER WITHOUT FORMING LUMPS

[75] Inventors: Gila Seewi, Heilbronn-Boeckingen; Gerhard Schneider, Heilbronn-Sontheim; Dieter Maier, Untergruppenbach; Hans Bohrmann, Talheim; Guenther Mueller, Flein, all of Fed. Rep. of Germany

[73] Assignee: CPC International Inc., Englewood Cliffs, N.J.

[21] Appl. No.: 553,729

[22] Filed: Nov. 21, 1983

[30] Foreign Application Priority Data

Nov. 27, 1982 [DE] Fed. Rep. of Germany ....... 3243963

[51] Int. Cl.$^4$ ............................ A23L 1/95; A23L 1/39
[52] U.S. Cl. ...................................... 426/99; 426/589; 426/661; 426/307; 426/456
[58] Field of Search ................. 426/589, 661, 99, 307, 426/456

[56] References Cited

U.S. PATENT DOCUMENTS

| | | | |
|---|---|---|---|
| 1,193,739 | 8/1916 | Till | ...................................... 426/589 |
| 1,380,815 | 6/1921 | Luft . | |
| 3,116,151 | 12/1963 | Giddey . | |
| 3,433,650 | 3/1969 | Block et al. . | |
| 3,560,220 | 2/1971 | Bangert et al. | ...................... 426/589 |
| 3,652,299 | 3/1972 | Penton | ................................. 426/589 |
| 3,987,207 | 10/1976 | Spaeti et al. . | |
| 4,016,337 | 4/1977 | Hsu . | |
| 4,126,710 | 11/1978 | Jaworski et al. . | |
| 4,363,824 | 12/1982 | Willi et al. . | |

FOREIGN PATENT DOCUMENTS

| | | |
|---|---|---|
| 793411 | 4/1973 | Belgium . |
| 1417553 | 12/1968 | Fed. Rep. of Germany . |
| 2717066 | 10/1982 | Fed. Rep. of Germany . |
| 1574567 | 9/1967 | Japan . |
| 4826234 | 8/1969 | Japan . |
| 459217 | 4/1970 | Japan . |
| 1254562 | 11/1971 | United Kingdom . |
| 1272079 | 4/1972 | United Kingdom . |
| 1355907 | 6/1974 | United Kingdom . |

*Primary Examiner*—Jeanette M. Hunter

[57] ABSTRACT

A process for the preparation of dehydrated base products for thickened soups and sauces which disperse readily in hot water and form thick, creamy, lump-free products. The product is prepared by combining a starchy material with an edible fat into a homogeneous mixture. Water is added to the mixture which may also contain milk proteins. The mixture is then subjected to heat treatment, cooled and grated. Optionally the homogeneous mixture is heated under elevated pressure.

19 Claims, No Drawings

PROCESS FOR PRODUCING A BASE PRODUCT FOR THICKENED SAUCES AND SOUPS WHICH DISPERSES IN HOT WATER WITHOUT FORMING LUMPS

FIELD OF THE INVENTION

This invention relates to a process for the preparation of a hot-water dispersible commercial dehydrated base product for thickened sauces and soups which are lump-free and have a creamy, smooth consistency.

BACKGROUND OF THE INVENTION

Soups and sauces prepared in powdered, dehydrated form and mixtures of various ingredients, among which are different types of flour, starches, powdered or chopped vegetables, meat extracts, sugar, salts, fat, oil, etc. Such soup and sauce mixes are well known in the art, However it is generally difficult to disperse these dehydrated mixes in hot or boiling water without the formation of lumps. Many attempts have been made to produce a heavy bodied, lump-free soup or sauce having a creamy consistency from such a dehydrated product. Even though these products offer a measure of convenience to the consumer, the prepared products have suffered from one or more additional disadvantages. Some dehydrated products have achieved viscosity or thick consistency through the use of increased amounts of solids in the base product. This method does not achieve a true creaminess and results in clumping, graininess, and other related problems in the soup or sauce. It would therefore be highly desirable to formulate a dehydrated base product which, upon stirring with addition of hot or boiling water, formed a lump-free, thick-bodied soup or sauce that obtained its creaminess from a source other than high solids content, while having a texture and taste similar to a freshly prepared home product.

A further problem observed in dehydrated base products for roux preparation is that, for a number of reasons, including that of a rather short storage life, these products do not lend themselves to large-volume production for stock, nor for production on an industrial scale. There have been many attempts to develop processes for the industrial manufacture of such roux products (Japanese Pat. Nos. 48-26234 and 45-9217, as well as German OS No. 14 17 553) but none of these methods has so far led to a fully satisfactory result, nor to general acceptance for industrial scale production.

The disadvantages described above in known processes are due to the fact that some of the constituents of such products, in particular those which act as starch-based binders, will swell very rapidly in hot water, so that the particles will stick together before they can be dispersed in water. In order to avoid the formation of lumps when these binders are used, powder can be dispersed very gradually in hot water with very thorough mixing, although this method is not particularly effective. To avoid the formation of large agglomerates when the powdered product comes into contact with the hot liquid, binders are used which consist of less rapidly swelling constituents, the only reach the fully hydrated state after a more or less prolonged period, in view of which the product has to be boiled.

Another method which has been used to improve the dispersion of such products in hot water is to coat the particles that are capable of swelling with a fatty or hydrophilic substance, thereby retarding the hydration of the particles and consequently improving their dispersion. However, a creamy consistency in the resulting product is not always found. One process using this method involves the formation of a thick mixture of farinaceous material through the use of water and hot liquid fat, while maintaining the mixture at a sufficient temperature to evaporate moisture and coat the particles with liquid fat. The resulting dough-like mixture is cooled to a temperature at which it reverts to a liquid state, then cooled further to form a plastic mass (U.S. Pat. No. 4,126,710). U.S. Pat. No. 3,987,207, involves the use of a granular mixture comprised of a pre-gelatinized starchy material which is coated with a fat component and with a finely-divided dispersion aid. The fat component consists of an edible fat and an oleophilic surfactant.

Another method which is also used is the granulation method in which the particles are mechanically grated or formed into granules in order to improve the dispersion of the given products in the liquid. This method, however, does not prevent the formation of lumps in hot water. This is due to the fact that the granules are too compact and the ratio between area and weight is too small for the area coming into contact with water to insure rapid dispersion of the constituents present in the granules.

An additional process that is used is called agglomeration, in which particles of the mixture are combined, to some extent, thereby resulting in the desired free flowing properties. An example of agglomeration in which the ingredients capable of agglomerating are coated with fat, is Great Britain Pat. No. 1,254,562, in which a dry soup mix combines a thickening agent with other ingredients to provide body and texture, and the ingredients of the mix are coated with fat which contains an emulsifying agent. In this manner, the coating of fat renders the mixture non-hygroscopic and causes the particles of the mixture to agglomerate, thereby improving flowability.

Another example of agglomeration is U.S. Pat. No. 4,016,337 in which a water-dispersible edible composition is formed by mixing co-agglomerates of a finely-divided non-dispersible material and a silicon dioxide flow agent. The co-agglomerates are then coated with a thin layer of an emulsion of edible fat and glycerol over their external surfaces to increase speed and completeness of dispersion.

The above-described known methods which can be used to produce dehydrated base products do not have the sensory appeal or other desired properties of a well made roux. A roux is a cooked mixture of a starchy material and fat used as a thickening agent in a soup or sauce, which is classically prepared with butter and flour. The preparation of a roux requires a great deal of care, substantial cooking ability and involves a laborious procedure. To duplicate the qualities of a home-made roux in a dehydrated base product requires a substantial improvement in the art.

It can be seen that for improved convenience, a hot or boiling water dispersible base product for soups and sauces that consistently provides a smooth texture which a home-made taste is desirable so that the consumer does not have to follow cumbersome cooking procedures often associated with the preparation of roux to thicken soups or sauces. It is also highly advantageous to have a base product which is suitable for use in soups or sauces while being storage-stable and easy to handle. It would be most beneficial if the base product having these properties could be made by a simple procedure that did not require expensive and cumbersome manufacturing processes. In this invention, a base product for soups and sauces which has the above-described advantages is provided through the use of the process described hereunder.

SUMMARY OF THE INVENTION

It is an object of the invention to provide a simplified economical process for producing dehydrated base products for soups and sauces which overcomes the disadvantages of prior processes. It is another object of the invention to provide a process which can be practiced on an industrial scale while at the same time yielding dehydrated base products of high thickening power which can be stored for long periods of time and are easy to handle. It is also an object of the invention to provide a process which produces a homogeneous mixture that is flowable and disperses in hot water without the formation of lumps. Still a further object of the invention is to provide thickened sauces and soups of a high quality which are smooth, and velvety in texture while providing a home-made flavor comparable to sauces and soups made from a roux that has been prepared by the skilled chef in the classical manner.

In accordance with this invention, a process is provided for the manufacture of dehydrated base products for thickened sauces and soups. The product is prepared from a starchy material, in particular a flour, featuring a customary moisture content, and edible hardened fats as essential components, as well as water, optionally milk proteins, and other additives. The components are homogeneously mixed together, following a strictly defined procedure, heated, and the resulting composition is optionally subjected to autogenic superatmospheric pressure, and grated. The improved product is readily dispersible in hot water and yields a creamy, smooth texture. This is accomplished by means of the following general sequential steps:
  a. Preparing a homogeneous pre-mix from the starch component and the hardened edible fat;
  b. Mixing said composition thus formed with added water in amounts of 0.5% to 15% by weight;
  c. Heating the mixture to a temperature between 90° and 155° C. under stirring conditions, resulting in the reduction of water content to at most 7.5% by weight;
  d. Heating the mixture can optionally also be conducted under autogenic superatmospheric pressure; and
  e. Grating the final composition, resulting in the end product which is to be manufactured.

DETAILED DESCRIPTION OF THE INVENTION

The central feature of the present invention is a process that compares favorably with "chef-made roux" which forms a product that is free-flowing and sufficiently stable at room temperature for manufacture and consumer use. The process of the invention produces a dehydrated (not more than 7.5% moisture and preferably less than 4% moisture) roux by:
  (1) Combining a starchy material (20% to 75% by weight) and a fatty hardened material (80% to 25% by weight) as homogeneously as possible;
  (2) Optionally adding water to the homogeneous mixture formed, (which mixture should not exceed a temperature of 100° C.). The water should be added in amounts of 0.5% to 15% by weight. It is preferable to add to the water 0.02% to 1% of weight of milk proteins which have been dispersed therein;
  (3) Heating the mixture with stirring, for 0.2 to 5 hours, which includes heating up and holding time, at 90° C.–155° C. to reduce the moisture of the product so as not to exceed 7.5% by weight;
  (4) Heating the mixture, optionally under autogenic superatmospheric pressure,
  (5) Optionally incorporating further additives, and
  (6) Optionally comminuting the resulting composition to a flowable product.

The preferred starchy material suitable for the purpose of the invention in flour, in particular wheat, rice or rye flours. However, starches are also effective, preferably granular, i.e. non-gelatinized starches of which tuber and root starches have proved to be particularly desirable for this purpose. The amount of starchy material, as mentioned above, generally ranges between about 25%–80% by weight, preferably within a range of 40% to 70% by weight, and still more preferably between 50% to 65% by weight. Preferred starchy materials are those featuring a customary moisture content.

The fat components suitable for the purpose of the invention are edible fats, optionally in liquefied form, of animal and vegetable origin. Fats which have proved to be particularly advantageous for the purpose of the invention are relatively hard, high-melting edible fats, in particular those with a melting point of at least 44° C. These specific fats have been found to yield products which show good stability and free flowing characteristics. It is preferable for the purpose of the invention to use edible fats having a content of polyunsaturated fatty acids of at most 30, preferably no more than 15 and more preferably less than 2.5% and optionally, a content of medium-and/or short-chain fatty acids of less than 20, preferably no more than 5 and more preferably below 0.2% by weight of total product. The amount of fat utilized may vary widely in the process of the invention, however, it has been found to be advantageous to utilize a fat content in the range of 30-60 and more preferably 35-50% by weight.

Aside from the essential components, namely fat and starchy materials, it is possible to optionally use, for this invention, the ordinary amounts of additional components commonly used in dehydrated sauce and soup products such as coloring materials and flavors. These components may be added to the dehydrated base products at any point of the process; either before, during or after the heat treatment. In another embodiment, water is added to the pre-mix, consisting of the starchy material and edible fat, in the form of bouillon, condiments, fruit juices, vegetable juices, as well as pureed fish, and meat. In an additional embodiment of the invention, finely chopped or pureed vegetables, in particular onions, carrots, leeks, parsley or celery may be added to the pre-mix in amounts of up to 18% by weight.

In carrying out the process of the invention, the fat and starchy materials are mixed together to effect the essential homogeneity of the ingredients. A mechanical kneader or mixer can be used for this purpose. According to the invention, the resulting mixture is then subjected to heat treatment. The temperature required for this heat treatment, i.e. the final temperature to which the mixture is exposed during the course of the heat treatment is reached gradually over time, especially if the process is carried out under normal or reduced pressure. It has been found advantageous to select a broad temperature range between 90° C. and 155° C.; preferably, experience has shown that a range of 105° C. to 150° C. shows better results, more preferably from 110° C. to 135° C. and still more preferably from 115° C. to 125° C. According to the process of the invention, these temperature ranges are desirable in order to avoid insufficient heat treatment or excessively long heat treatment at relatively low temperatures on the one hand as well as excessively fast or intense browning at relatively high temperatures on the other.

The length of the heat treatment, including the heating-up phase and holding time, may vary depending upon the desired effect, the composition of the batch, the rate of heating-up and the temperature chosen for the heat treatment itself. However, it has been found beneficial to adjust the length of time of the heat treatment so as to range broadly from 0.2 to 5 hours; preferably from 0.3 to 3.5 hours; more preferably, experience shows better results from 0.4 to 2.5 hours, and still more preferably from 0.5 to 1.5 hours. When preparing a white base product, it is generally desirable to keep the length of heat treatment relatively short by applying high treatment temperatures, and heating up quickly in order to maintain the desired product coloring.

As has already been mentioned, it is advantageous according to the process of the invention to adjust the heat treatment so as to reduce the water composition of the pre-mixture down to a maximum of 7.5% by weight. It has been found desirable to further reduce the water content to at most 6, preferably no more than 5 and more preferably less than 4% by weight. The reduction in water content of the pre-mix by the end of the heat treatment results in a thick, yet creamy-textured product.

As discussed, in one preferred embodiment, the moisture level of the batch is adjusted through the addition of water to the mixture. The water is added at a temperature in the range of 55° C.–80° C. The temperature of the mixture when the water is added should not exceed 100° C. The optimum amount of liquid to be added to the mixture will depend upon the parameters of the pre-mixture; in particular on the type, amount and moisture content of the remaining components of the batch, the conditions of treatment, and the result desired. However, it is advantageous to adjust the moisture level to be added to the pre-mix so as to range broadly from 0.5 to 15, preferably from 1.5 to 10, more preferably from 2 to 7, and still more preferably from 2.8 to 4% by weight.

In one preferred embodiment optimum product properties are the result of adding negligible amounts of milk protein which, for the purposes of the invention, are best incorporated into the mixture in the form of dispersions in added water. The milk protein may also be added in powdered form to the product. The amount of milk protein added in the process of the invention ranges between 0.02–1% by weight. It is preferable to use additions of milk protein of between 0.03 to 0.35, preferably between 0.05 to 0.2 and more preferably between 0.07 to 0.15% by weight. Suitable milk proteins for the process of the invention are casein(ates), or whey protein which may, for the purposes of the invention, be used mixed with lactose, whey powder and/or skim milk powder. The added water with milk protein dispersed therein may therefore also consist of cream, whole milk or skim milk.

Finally, in another preferred embodiment, the mixture is heated under autogenic superatmospheric pressure to obtain the optimum water content and the desirable smooth, lump-free consistency of the product.

The following examples and comparison tests below illustrate the practice of the invention.

COMPARISON TEST 1

In this test, three kilograms of melted hardened vegetable fat with a melting point of 45° C. and 0.3 liters of water at 60° C. were placed in a kneader which had been preheated to 60° C. Then 4.5 kilograms of wheat flour was added and kneaded into the mixture of fat and water. The temperature was then raised to 120° C. and the mixture held constant at this temperature for 20 minutes. In the course of this heat treatment, most of the added water and a major part of the water originally contained in the flour evaporated. Subsequently, the product was cooled to room temperature and grated. The final water content of the product was 3.6% by weight. The grated product was found to have desirable flowability and a pleasant taste. However, upon stirring into boiling water, lumps were formed which did not dissolve even after prolonged boiling and stirring.

EXAMPLE 1

In this example, the procedure used was the same as that used in Comparison Test 1 except that the melted hardened vegetable fat was placed in the kneader first and the flour added subsequently. After these two components had been mixed together until completely homogeneous, the water was added. The final water content of the product was 3.2% by weight. The grated product had good flowability and when stirred into boiling water, no lumps were formed. The taste of the resulting sauce or soup base was pleasant and very smooth and delicate in structure, however a certain gel structure developed upon cooling.

COMPARISON TESTS 1A AND 1B

These two comparison tests were run analogously to Example 1, except that no water was added in Comparison Test 1A and in place of the customary flour having a water content of approximately 14%, the water content of the dried flour of Comparison Test 1B was 6% by weight. The end products, upon stirring into boiling water, exhibited a pronounced gel structure and were therefore unsuitable for the purpose of the invention.

EXAMPLE 2

In this example, the procedure of Example 1 above was used, however the added water contained 0.5% of skim milk powder by weight. The properties of the resulting product were analogous to those of the product obtained in Example 1. The product structure however, was even more smooth and velvety, with better color and better consistency than that found in Example 1. The gel structure observed in Example 1 did not appear in the product obtained in Example 2.

EXAMPLE 3

In this example 3 kilograms of melted hardened vegetable fat and 4.5 kilograms of wheat flour were homogeneously mixed in a heatable mixer which had been preheated to 60° C. Then, 0.9 kilograms of a mixture of chopped vegetables consisting of 0.4 kilograms onions, 0.2 kilograms carrots, 0.1 kilograms leek, 0.1 kilograms celery root and 0.1 kilograms tomato pulp (twice concentrated) were stirred in, homogeneously mixed and subjected to heat treatment with subsequent cooling and grating as described in Example 1 above. The final water content of the product was 4.6% by weight. The end product showed good flowing properties, and exhibited a light brown color when stirred into boiling water without the formation of lumps. The consistency was smooth and creamy. Upon reheating, the mixture was found to have a pleasant taste of vegetables and a roasted flavor.

EXAMPLE 3A

This example was run analogously to Example 3 except that during the heating step a low vacuum (0.1–0.3 bar) was applied for better removal of the steam. Through the use of this step, the duration of the heat treatment, largely determined by the rate of water evaporation, was greatly reduced without causing any change in the good quality of the final product.

EXAMPLE 4

This example was run analogously to Comparison Test 1 above, except that pre-heating and the heat treatment itself took place in a closed kneader. The superatmospheric pressure in the kneader was approximately 1.2 bars at a treatment temperature of 120° C. When the product reached the temperature of 120° C., steam was vented so that the above-mentioned superatmospheric pressure was initially retained at that level. After a few minutes of maintaining the pressure at 1.2 bars, the superatmospheric pressure was continuously lowered to 0 while a temperature of 120° C. was maintained in the product. The temperature of the product was maintained at 120° for 20 minutes and then the composition was cooled down and subsequently grated. The final water content of the product was 3.6% by weight. Through application of superatmospheric pressure, the relatively lengthy treatment time used in Examples 1–3 was reduced by one-half. The resulting flowable product, brownish in color, dispersed readily in boiling water without the formation of lumps and exhibited a smooth, creamy structure.

EXAMPLE 4A

This example was conducted under similar conditions to Example 4 except that since the browning of the final product described in Example 4 is not always desired, Example 4A was run with 4.5 kilograms of wheat flour with a customary water content (14%) and 4.5 kilograms of hardened vegetable fat under the same process conditions as those described in Example 4 above, without the addition of water and milk protein. The final water content was 3.5% by weight. The grated white product, when stirred into boiling water, did not form lumps, or develop into a gel in either the hot state or during cooling. This example thus showed that boiling the product in water resulted in the same smooth and creamy structure which is obtainable by heat treatment under reduced or normal pressure with milk protein and water added to the mixture.

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed:

1. A process for the preparation of a dehydrated base product for thickened sauces and soups which disperses in hot water without forming lumps, consisting of the steps of:
    (a) adding from twenty to seventy-five percent (20%–75%) by weight of a starchy material to eighty to twenty-five percent (80%–25%) by weight of melted hardened edible fat having a melting point of about 45° C. to form an essentially homogeneous mixture;
    (b) adding to said mixture one half to fifteen percent (0.5%–15%) by weight of water while maintaining said mixture at a temperature not to exceed 100° C.;
    (c) heating said mixture, while continuously stirring, to a temperature ranging from 90°–155° C. for a period of from 0.2 to 5 hours until the water content of said mixture has been reduced so as not to exceed 7.5% by weight;
    (d) cooling said mixture to room temperature; and
    (e) grating said mixture to form a free flowing dehydrated base product.

2. The process of claim 1 wherein the mixture contains 0.02%–1% by weight of milk protein.

3. The process of claim 1 wherein autogenic superatmospheric pressure is applied to said mixture during said heating step.

4. The process of claim 1 wherein water is added in the range of 1.5%–10% by weight and the mixture is heated to and maintained at a temperature in the range of 105°–150° C. during a period of from 0.3 to 3.5 hours until the water content of said mixture has been lowered so as not to exceed 6% by weight.

5. The process of claim 4 wherein water is added in the range of 2%–7% by weight of total product and the mixture is heated and maintained at a temperature in the range of 110°–135° C. during a period of from 0.4 to 2.5 hours until the water content of said mixture has been lowered so as not to exceed 5% by weight.

6. The process of claim 1 wherein the water that is added is at a temperature in the range of 55° C.–80° C.

7. The process of claim 1 wherein the starch material comprises, at least in part, a flour selected from the group consisting of wheat flour and rice flour.

8. The process of claim 7 wherein the starch material comprises, at least in part, a granular starch selected from the group consisting of root starch and tuber starch.

9. The process of claim 1 wherein the edible fat comprises, at least in part, polyunsaturated fatty acids in an amount less than 30% by weight.

10. The process of claim 9 wherein the edible fat comprises, at least in part, polyunsaturated fatty acids in an amount less than 2.5% by weight.

11. The process of claim 10 wherein the edible fat comprises, at least in part, medium and short chain fatty acids in an amount less than 20% by weight.

12. The process of claim 11 wherein the edible fat comprises, at least in part, medium and short chain fatty acids in an amount less than 0.2% by weight.

13. The process of claim 1 wherein 40%–70% by weight of a starchy material is combined with 60%–30% by weight of edible fat.

14. The process of claim 13 wherein 50%–65% by weight of a starchy material is combined with 50%–35% by weight of total fat.

15. The process of claim 2 wherein the milk protein is in the form of casein(ates) or whey protein which may be mixed at least in part with members of the group consisting of lactose, whey powder and skim milk powder.

16. The process of claim 15 wherein the milk protein is dispersed in water in the amount of 0.03%–0.35% by weight.

17. The process of claim 16 wherein the milk protein is dispersed in water in the amount of 0.05%–0.2% by weight.

18. The process of claim 1 wherein the dehydrated base product is incorporated with coloring and flavoring matter.

19. The process of claim 1 wherein the mixture of starchy material and fat is admixed with finely chopped food ingredients in an amount so as not to exceed 18% by weight.

* * * * *